United States Patent
Lee et al.

(10) Patent No.: US 7,266,424 B2
(45) Date of Patent: Sep. 4, 2007

(54) WALKING ROBOT USING SIMPLE GROUND REACTION FORCE SENSORS AND A METHOD OF CONTROLLING THE SAME

(75) Inventors: Yong-Kwun Lee, Suwon (KR); Yeon-Taek Oh, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

(21) Appl. No.: 10/745,996

(22) Filed: Dec. 29, 2003

(65) Prior Publication Data

US 2005/0049748 A1    Mar. 3, 2005

(30) Foreign Application Priority Data

Aug. 29, 2003  (KR) ................ 10-2003-0060322

(51) Int. Cl.
  *G06F 19/00* (2006.01)
(52) U.S. Cl. .................. 700/245; 700/250; 318/568.2; 901/1
(58) Field of Classification Search ................ 700/245, 700/250; 318/568.2; 901/1
See application file for complete search history.

(56) References Cited

U.S. PATENT DOCUMENTS

| | | | |
|---|---|---|---|
| 6,243,623 B1 | 6/2001 | Takenaka | |
| 6,580,969 B1 * | 6/2003 | Ishida et al. | 700/245 |
| 6,992,457 B2 * | 1/2006 | Furuta et al. | 318/568.12 |
| 2003/0144763 A1 * | 7/2003 | Mori et al. | 700/245 |
| 2005/0240307 A1 * | 10/2005 | Kuroki et al. | 700/245 |

* cited by examiner

*Primary Examiner*—Thomas Black
*Assistant Examiner*—Marie A Weiskopf
(74) *Attorney, Agent, or Firm*—Stanzione & Kim, LLP

(57) ABSTRACT

A walking robot using simple ground reaction force sensors and a method of controlling the same. It is an aspect of the present invention to provide the walking robot and the method of controlling the same, which reduces development and manufacturing costs of the walking robot and allows non-specialists to easily participate in the development. The walking robot includes a plurality of legs. One or more sensors are mounted on soles of each of the legs to detect whether the soles of each of the legs are in contact with a ground during locomotion. The walking robot performs the locomotion according to a locomotion pattern composed of a plurality of locomotion cycles, and proceeds from a current locomotion cycle to a next locomotion cycle after determining whether the current locomotion cycle is stable using detection results of the sensors.

20 Claims, 6 Drawing Sheets

FIG. 1A
FIG. 1B
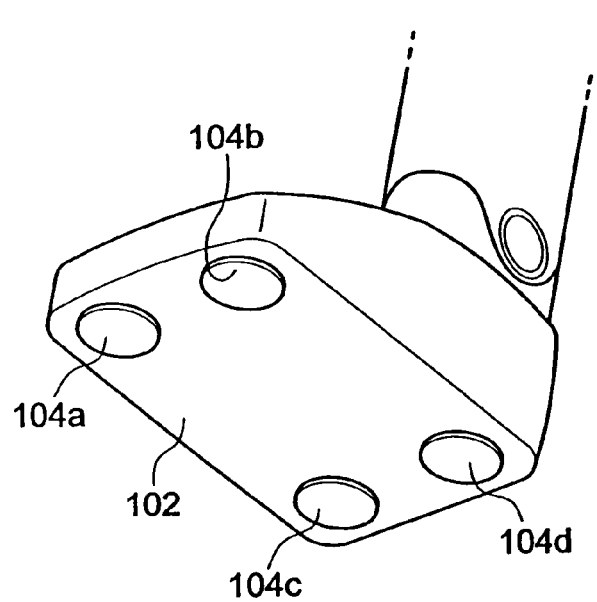
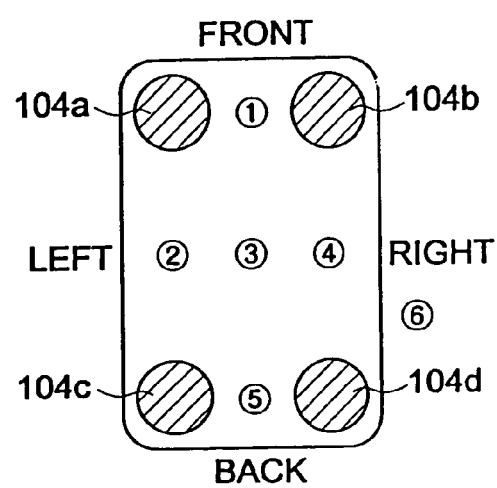

WALKING ROBOT USING SIMPLE GROUND REACTION FORCE SENSORS AND A METHOD OF CONTROLLING THE SAME

CROSS-REFERENCE TO RELATED APPLICATIONS

This application claims the benefit of Korean Patent Application No. 2003-60322, filed Aug. 29, 2003 in the Korean Intellectual Property Office, the disclosure of which is incorporated herein by reference.

BACKGROUND OF THE INVENTION

1. Field of the Invention

The present invention relates, in general, to mobile robots and, more particularly, to a walking robot that performs locomotion or other operations similar to locomotion using movable legs.

2. Description of the Related Art

Recently, research and development on walking type mobile robots, which imitate body mechanisms and motions of some mammals, such as humans and monkeys, performing biped locomotion with an upright posture, have been carried out, so that an expectation of practical use of the walking type mobile robots has increased. Compared with four-legged or six-legged locomotion, the biped locomotion with the upright posture is unstable, and it is difficult to control a posture thereof. However, the biped locomotion is advantageous in that it is capable of coping with a surface having prominences and depressions, such as an uneven surface or an obstacle, and a discontinuous surface, such as stairs or a ladder, so that a flexible mobile operation may be implemented.

A biped walking robot involves many technical difficulties compared with a three or more-legged walking robot in that the biped walking robot should be stably controlled by analyzing mechanisms, dynamics, and system characteristics thereof. Stable locomotion of the biped walking robot may be defined as mobility (locomotion) without tipping over. In particular, stable posture control of the biped walking robot is very important to avoid tipping over of the biped walking robot. The tipping over of the biped walking robot during locomotion implies that an operation being performed is discontinued. If the operation is resumed after the biped walking robot has tipped over and has been set upright, operation time is delayed by at least the discontinued operation time. Further, not only a body of the walking robot suffers from tipping over, but an object colliding with the walking robot may also suffer serious damage by the tipping over of the biped walking robot during locomotion, so that very serious problems may result in some cases. Therefore, stable posture control and prevention from tipping over during locomotion are parts of most important considerations in design and development of the walking robot.

Currently, a locomotion control technique for the biped walking robot employs a Zero Moment Point (ZMP) theory as a criterion to evaluate stability of locomotion. The ZMP theory states that a point where a pitch axis moment and a roll axis moment are zero, that is, a ZMP, exists inside of a ZMP stable region formed by ground contact points of a sole of a foot and a ground surface. According to the ZMP theory, if the ZMP exists inside of a supporting polygon formed by legs and the ground surface, and a force acts in a direction in which the walking robot presses the ground surface at every instant of locomotion, the walking robot does not tip over and performs stable locomotion.

Until now, most of the control algorithms of the biped walking robot have been based on the ZMP theory since the ZMP theory and a numerical formula are relatively simple compared with motion equations of an entire robot, so that a real-time operation is possible. However, to realize dynamic locomotion (using an inertia force) of the biped walking robot by applying the ZMP theory to the biped walking robot, below-described disadvantages among others result.

To apply the ZMP theory to the biped walking robot, a ground reaction sensor, such as a six-axis load cell, should be used on an ankle part, and an acceleration sensor and a gyro sensor should be used on a body or a center of gravity of the biped walking robot. However, the ground reaction sensor is relatively expensive, so that development and manufacturing costs of the biped walking robot increase.

Meanwhile, a solution to a ZMP equation should be obtained, and dynamic locomotion of the biped walking robot should be controlled based on the obtained solution. For this purpose, a high-performance operation processor (that is, a computer) should be used. Furthermore, the dynamic locomotion control of the biped walking robot using the ZMP theory should have exact periodicity, and a Real-Time Operation System (RTOS) should be used for the control. The high-performance operation processor and the RTOS are all expensive, which causes increases in the development and manufacturing costs. In particular, the RTOS incurs many restrictions relating to time when the control of the dynamic locomotion of the biped walking robot is implemented.

Furthermore, to control the biped walking robot using the ZMP theory, data must be accumulated by carrying out many experiments while setting and tuning parameters, and professional knowledge in various fields, such as design, control, dynamics analysis, etc., is required for the carrying out of the experiments. Further, in case of necessity, tools for system analysis, dynamics analysis, and verification of the stability of the control are additionally required. The restrictions described above may decrease a number of opportunities for general public to participate in the development of the biped walking robot, thus acting as a chief factor retarding progress of technical developments of the biped walking robot.

SUMMARY OF THE INVENTION

Accordingly, it is an aspect of the present invention to provide a walking robot and a method of controlling the walking robot, which reduces development and manufacturing costs of the walking robot, and which allows non-specialists to easily participate in the development thereof.

Additional aspects and/or advantages of the present invention will be set forth in part in the description which follows and, in part, will be obvious from the description thereof, or may be learned by practice of the invention.

The above and/or other aspects of the present invention are achieved by providing a walking robot, including a plurality of legs each having a respective sole, and one or more sensors mounted on each of the soles to detect whether each of the soles is in contact with a ground during locomotion, the walking robot performing the locomotion according to a locomotion pattern composed of a plurality of locomotion cycles, and proceeding from a current locomotion cycle to a next locomotion cycle after determining whether the current locomotion cycle is stable using detection results of the sensors.

The above and/or other aspects of the present invention are also achieved by providing a walking robot, including a plurality of legs, a plurality of feet each provided with a sole having an area and each connected mechanically to a respective one of the legs through an ankle joint, a plurality of sensors mounted at predetermined locations of each sole formed on a lower part of each of the respective legs, and provided with states that change by coming in contact with a ground during locomotion, a storage unit to store information on the changes of states of the sensors previously obtained when locomotion cycles are stably performed during the locomotion according to a locomotion pattern composed of the plurality of locomotion cycles, and to store the information, and a control unit to obtain information on the changes of states of the sensors, to evaluate stability of a current locomotion cycle by comparing the obtained information with the stored information, and to control the ankle joints to allow the current locomotion cycle to have stability.

The above and/or other aspects of the present invention are also achieved by providing a method of controlling a walking robot, the walking robot having sensors mounted at predetermined locations of each of a plurality of soles and provided with states that change by an external force, and performing locomotion according to a locomotion pattern composed of a plurality of locomotion cycles, the method comprising: including evaluating a current locomotion cycle and stability of the locomotion using changes of states of the sensors generated when the plurality of the soles come in contact with a ground when the walking robot performs the locomotion, and controlling a posture of the waling robot and performing a next locomotion cycle according to results of the evaluation.

The above and/or other aspects of the present invention are also achieved by providing a control system of a walking robot, the walking robot having left and right legs each having a foot and a sole attached thereto via respective left and right an ankle joints controlled by respective left and right ankle joint motors, the control system comprising: a sensor unit mounted on each sole of the walking robot, a control unit to receive information from the sensor unit and evaluate a current movement state and stability of the walking robot, to generate a control signal corresponding to the received information, and a joint drive unit to obtain a stable movement by activating the left ankle joint motor and the right ankle motor according to the control signal generated by the control unit.

BRIEF DESCRIPTION OF THE DRAWINGS

These and other aspects and advantages of the present invention will become apparent and more readily appreciated from the following description of the preferred embodiments, taken in conjunction with the accompanying drawings of which:

FIGS. 1A and 1B are views showing an arrangement and operations of sensors mounted on a sole of a foot of a walking robot, according to an embodiment of the present invention;

DETAILED DESCRIPTION OF THE PREFERRED EMBODIMENTS

Figure 2:
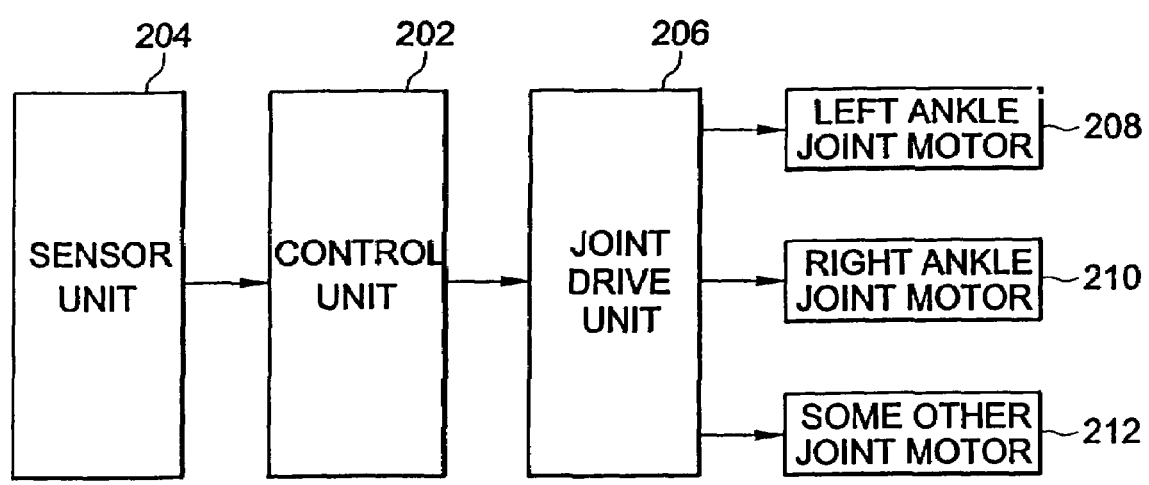
FIG. 2 is a block diagram showing part of a control system of the walking robot of the embodiment of FIG. 1.

Reference will now be made in detail to the present preferred embodiments of a walking robot and a method of controlling the same, according to the present invention, examples of which are illustrated in a FIG. 1A to FIG. 5B, wherein like reference numerals refer to like elements throughout.

FIGS. 1A and 1B are views showing an arrangement and operations of sensors 104a to 104d mounted on a sole 102 of a foot of a walking robot. As shown in FIG. 1A, a total of four sensors 104a to 104d, with two sensors 104a and 104b located on a front portion of the sole 102 of the walking robot and two sensors 104c and 104d located on a back portion thereof, are mounted on the sole 102 to detect whether the sole 102 is in contact with a ground while the walking robot of the present invention performs locomotion. The arrangement of the sensors 104a to 104d forms a rectangle. It is possible to detect not only whether the sole 102 is in contact with the ground, but also which part (front/back/right/left) of the sole 102 is in contact with the ground through the arrangement of the sensors 104a to 104d. With the above detecting arrangement, a current locomotion state and stability of the walking robot are evaluated. In more detail, the current locomotion state and the stability are evaluated by digitally detecting whether ground reaction forces applied to the sole 102 during the locomotion are detected using the sensors 104a to 104d mounted on the sole 102 of the walking robot of the present invention.

Touch sensors, force sensing resistor (FSR) sensors, pressure sensors, or the like may be used as the sensors 104a to 104d. States of the sensors 104a to 104d are changed depending on whether or not the sole 102 of the walking robot is in contact with the ground. The sensors 104a to 104d generate at least two different kinds of output signals, which represent respective cases (for example, ON and OFF). The touch sensors are the most simple and inexpensive sensors. When the sole 102 comes in contact with the ground while the walking robot performs the locomotion, the touch sensors are turned on. In contrast, when the sole 102 is not in contact with the ground, the touch sensors are turned off. The FSR sensors or pressure sensors are used if it is desired not only to determine whether the sole 102 comes in contact with the ground but also to measure a magnitude of the ground reaction force applied to the sole 102 while the walking robot steps on the ground. Any device may be used as an alternative to the sensors above as long as the device is capable of detecting whether a part of or the entire sole 102 of the walking robot of the present invention is in contact with the ground.

A change in the states (ON/OFF) of each of the sensors 104a to 104d mounted on the sole 102 of the walking robot is a basis to evaluate the locomotion state and stability of the walking robot. As the number of sensors increases, a number of combinations of the sensors increases, thus complicating control logics. Accordingly, it is sufficient to mount four sensors 104a to 104d on the one sole 102, as shown in FIG.

1A, or to mount three sensors in some cases. Three sensors may be used because a plane is formed when the three sensors are in contact with the ground at three points. However, for a more exact evaluation of the stability of the walking robot, use of four sensors is described herein. In a case of using four sensors 104a to 104d, a total of 16 combinations ($=2^4$) are possible, but six combinations (1) to (6) shown in FIG. 1B are sufficient to control the locomotion. Meanwhile, 36 combinations are sufficient for two feet LF and RF. The 36 combinations not only allow states to be distinguished from each other, but also are simply managed compared with other sensor systems having infinite states (for example, a six-axis load cell). For example, both motion and stability controls of each of the states are easily implemented using only SWITCH sentences and CASE sentences in C Language. The six combinations shown in FIG. 1B, ON/OFF states of the sensors 104a to 104d corresponding to the combinations, and the locomotion states of the walking robot corresponding to the ON/OFF states of the sensors are described below.

TABLE 1

| Combination | State of sensors | | | | Locomotion state |
| --- | --- | --- | --- | --- | --- |
| | 104a | 104b | 104c | 104d | |
| (1) | ON | ON | OFF | OFF | center of gravity is offset to front side of robot |
| (2) | ON | OFF | ON | OFF | center of gravity is offset to left side of robot |
| (3) | ON | ON | ON | ON | center of gravity lies in center of robot |
| (4) | OFF | ON | OFF | ON | center of gravity is offset to right side of robot |
| (5) | OFF | OFF | ON | ON | center of gravity is offset to backside of robot |
| (6) | OFF | OFF | OFF | OFF | sole is completely not in contact with ground |

Stability of locomotion is evaluated with reference to information on the locomotion states of the walking robot corresponding to the ON/OFF states of the sensors 104a to 104d shown in TABLE 1, a posture of the walking robot is controlled based on the evaluation and, thereafter, a next locomotion operation is performed. With respect to TABLE 1, in a case of using the FSR sensors or the pressure sensors, a detected value of each of the sensors is compared with a preset reference value, and thereafter, is preferably allowed to represent one of the two states, ON and OFF, depending on whether the detected value is higher than the preset reference value or not.

FIG. 2 is a block diagram showing part of a control system of the walking robot of FIG. 1, according to the embodiment thereof. As shown in FIG. 2, a control unit 202 of the walking robot receives information from a sensor unit 204 mounted on the sole 102 to evaluate a current locomotion state and stability of the walking robot, generates a control signal corresponding to the received information, and provides the control signal to a joint drive unit 206. The joint drive unit 206 realizes stable locomotion by activating a left ankle joint motor 208, a right ankle joint motor 210, and/or some other joint motor 212 according to the control signal received from the control unit 202. A method of controlling the walking robot using the control unit 202 according to another embodiment of the present invention is described below with reference to FIG. 3.

Figure 3:
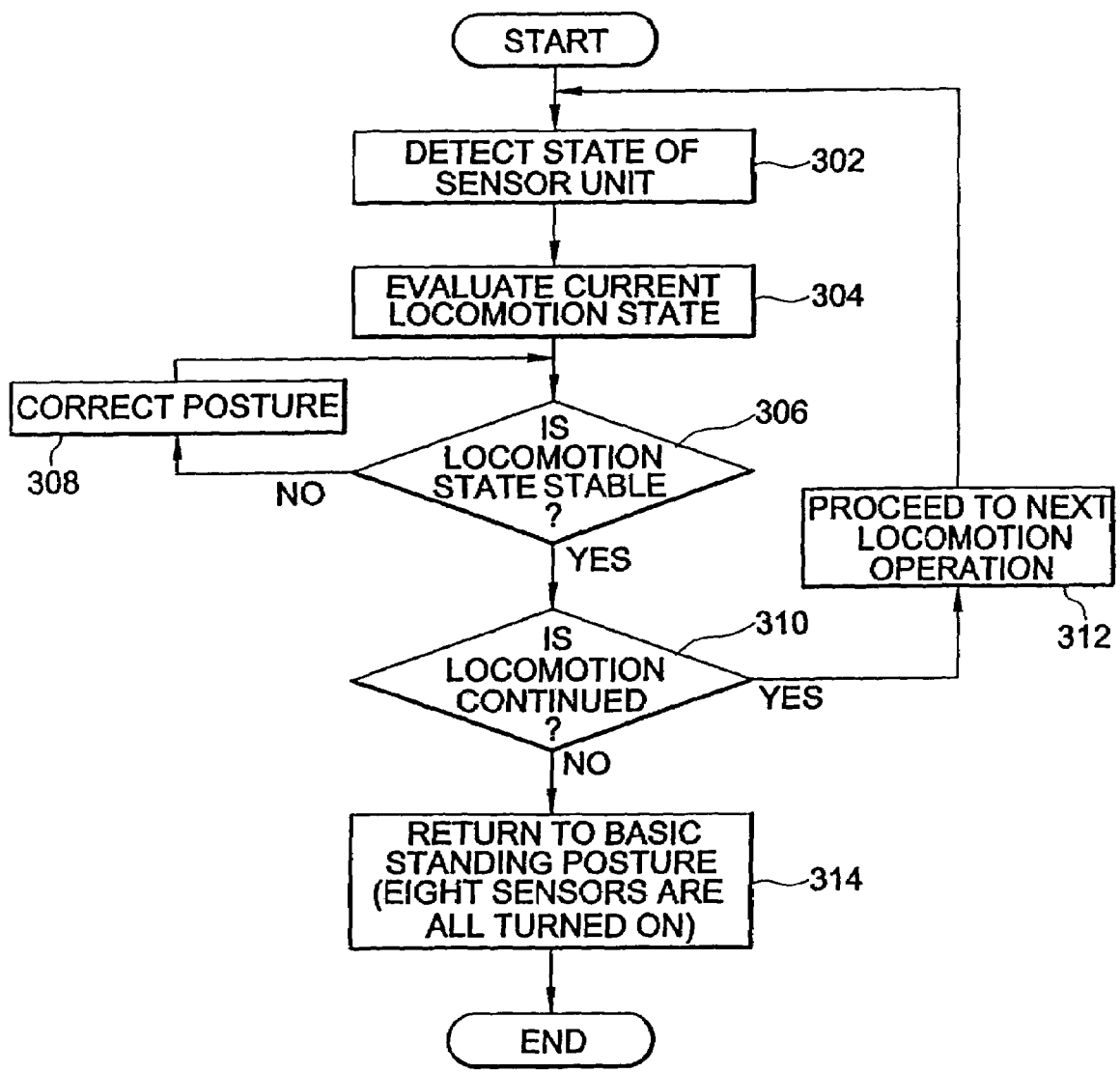
FIG. 3 is a flowchart showing a method of controlling the walking robot of FIG. 1 according to another embodiment of the present invention.

FIG. 3 is a flowchart showing the method of controlling the walking robot of FIG. 1, according to another embodiment of the present invention. As shown in FIG. 3, a state of the sensor unit 204 is detected in operation 302, and a current locomotion state is evaluated in operation 304. To proceed to a next walking operation, the current locomotion state should have at least a minimum stability required to proceed to a next locomotion operation. Accordingly, it should be determined whether the current locomotion state is stable in operation 306. If the current locomotion state is not stable, the stability of the locomotion state must be ensured by correcting a posture of the walking robot in operation 308. In contrast, if the locomotion state is stable and continuation of the locomotion is desired in operation 310, the walking robot performs the next locomotion operation in operation 312, and operation 302 of detecting the state of the sensor unit 204 is repeated. If discontinuation of the locomotion is desired, the walking robot returns to a basic standing posture in operation 314, which is a state in which the sole 102 of two feet of the walking robot of the present invention are in contact with the ground and all sensors are turned on.

The walking robot of the embodiment of FIG. 1 performs the locomotion according to a pre-defined locomotion pattern composed of a plurality of locomotion cycles, in which a reflective dynamic locomotion is performed. In the reflective dynamic locomotion, a next locomotion cycle is reflectively performed if the minimal stability required to proceed to the next cycle is ensured in each of the locomotion cycles. The sensors 104a to 104d are used to evaluate the locomotion state and the stability of the walking robot in each of the locomotion cycles, and to determine whether the next locomotion cycle will be performed. The walking robot of the embodiment of FIG. 1 performs the locomotion according to the pre-defined locomotion pattern composed of a plurality of the locomotion cycles, which are described below with reference to FIG. 4.

FIGS. 4A to 4I are views showing the locomotion cycles constituting a locomotion pattern of the walking robot of FIG. 1 and states of the sensors 104a to 104d in the locomotion cycles. In FIGS. 4A to 4I, B and L indicated on the walking robot represent appearances of the walking robot viewed from a backside and a left side thereof, respectively. LF and RF represent a left foot and a right foot, respectively, and circles indicated on soles 102 represent the sensors, respectively. In FIGS. 4A to 4I, when one or more of the sensors (104a to 104d as illustrated in FIG. 1) are turned on because the sensors of the soles 102 are completely in contact with the ground, the sensors 104a to 104d are colored black. When one or more of the sensors 104a to 104d are turned off because one or more of the sensors 104a to 104d of the soles 102 are not completely in contact with the ground, the sensors are colored white. When it does not matter whether the sensors 104a to 104d are turned on or off, the sensors are hatched, also illustrated in FIGS. 4A to 4I. The locomotion pattern of the walking robot shown in FIG. 4 is described below.

Figure 4E:
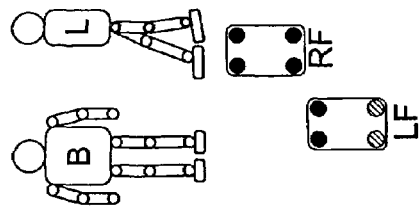
FIGS. 4A-4I are views showing each of several locomotion cycles of the walking robot of FIG. 1, which combine to form a locomotion pattern of the walking robot and a state change of the sensors in each of the locomotion cycles of the walking robot.
Figure 4D:
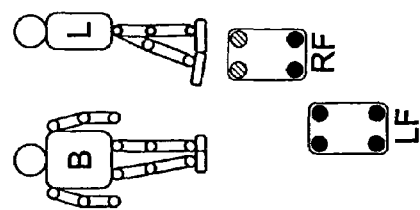
Figure 4C:
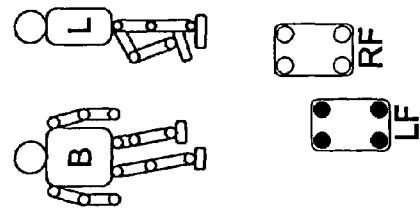
Figure 4B:
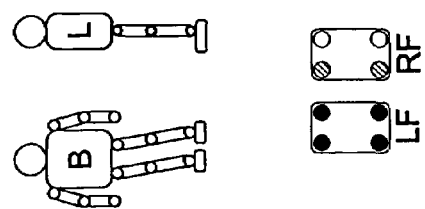
Figure 4A:
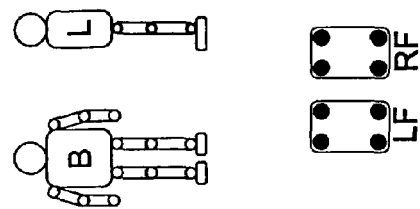

<FIG. 4A: Basic Standing Posture>

FIG. 4A shows a basic standing posture of the walking robot, according to the embodiment of FIG. 1. In this posture, the two feet LF and RF are all stably in contact with the ground, so that eight sensors of the two feet LF and RF are all turned on.

<FIG. 4B: Control of Leaning Body to the Left>

To perform forward locomotion from the basic standing posture shown in FIG. 4A, the right foot RF (the left foot LF also may be the first stepped foot) should be extended forward. When the right foot RF is not in contact with the ground, a body of the walking robot is leaned to a left side thereof in order not to lose balance thereof, as shown in FIG. 4B. At this time, the left foot LF is completely in contact with the ground so that four sensors (i.e., 104a to 104d) of the left foot LF are all turned on. In contrast, two outside sensors (i.e., 104b and 104d) of the right foot RF are turned off because an outside portion of the right foot RF is slightly lifted.

<FIG. 4C: Movement of the Right Foot RF Forward>

The right foot RF is lifted and extended forward to perform forward locomotion. At this time, the left foot LF is in contact with the ground. The right foot RF extended not completely in contact with the ground, so that four sensors of the right foot RF are all turned off.

<FIGS. 4D to 4E: Stepping of the Right Foot RF on Ground and Preliminary Action of Left Foot LF>

When the right foot RF extended forward steps on the ground, two backside sensors of the right foot RF come in contact with the ground and are turned on. When the right foot RF completely steps on the ground (four sensors are all turned on), the left foot LF should be immediately extended forward to perform continuous locomotion. For this purpose, a backside of the left foot LF may be somewhat lifted, as shown in FIG. 4E.

Figure 4I:
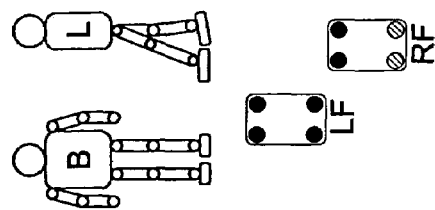
Figure 4H:
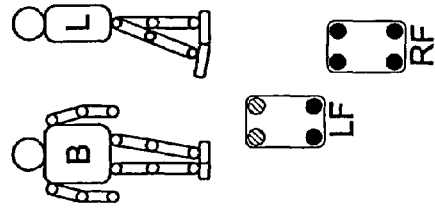
Figure 4G:
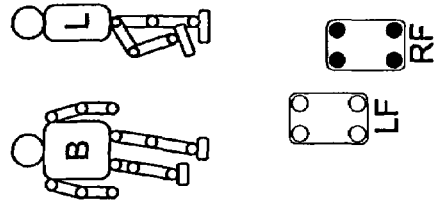
Figure 4F:
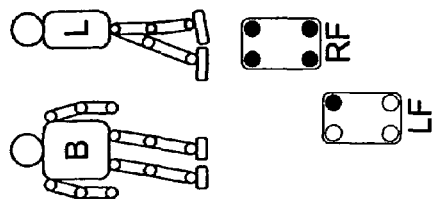

<FIG. 4F: Control of Leaning Body to the Right>

Like the control of leaning the body to the left, when the left foot LF is extended forward, the body is leaned to the right side in order not to lose balance thereof. At this time, the backside of the left foot LF is somewhat lifted in the locomotion cycle of FIG. 4E. As a result, an inside sensor of a front side of the left foot LF is in contact with the ground, and maintains a state of being temporarily turned on (transient state). Thereafter, when the left foot LF is completely lifted, the sensors of the left foot LF are all turned off.

<FIG. 4G: Movement of the Left Foot LF Forward>

Following the control of leaning the body to the right as shown in FIG. 4F, the left foot LF is extended forward. At this time, the right foot RF is stably in contact with the ground, so that the four sensors of the right foot RF are all turned on. In contrast, the left foot LF is in a state of being not in contact with the ground and is suspended, so that the four sensors of the left foot LF are all turned off.

<FIG. 4H to 4I: Stepping of the Left Foot LF on the Ground and a Preliminary Action of the Right Foot RF>

When the left foot LF extended forward steps on the ground, two backside sensors of the left foot LF come in contact with the ground and, thus, are turned on. When the left foot LF completely steps on the ground (four sensors 104a to 104d are all turned on), the right foot RF should be immediately extended forward to perform the continuous locomotion. For this purpose, the backside of the right foot RF may be slightly lifted, as shown in FIG. 4I.

Figure 5A:
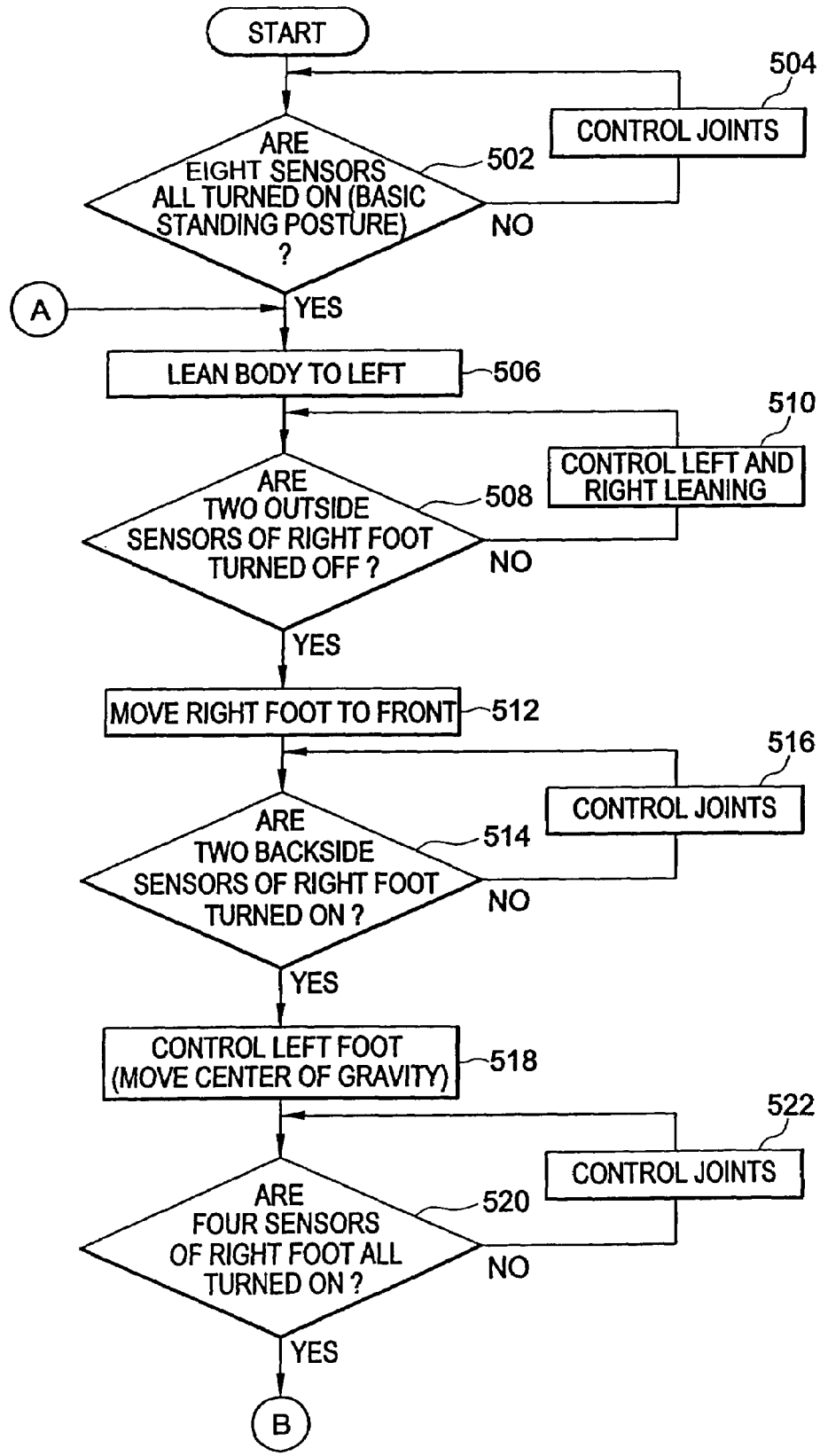
FIGS. 5A and 5B are flowcharts showing a control method to implement a locomotion pattern of the walking robot of FIG. 1.
Figure 5B:
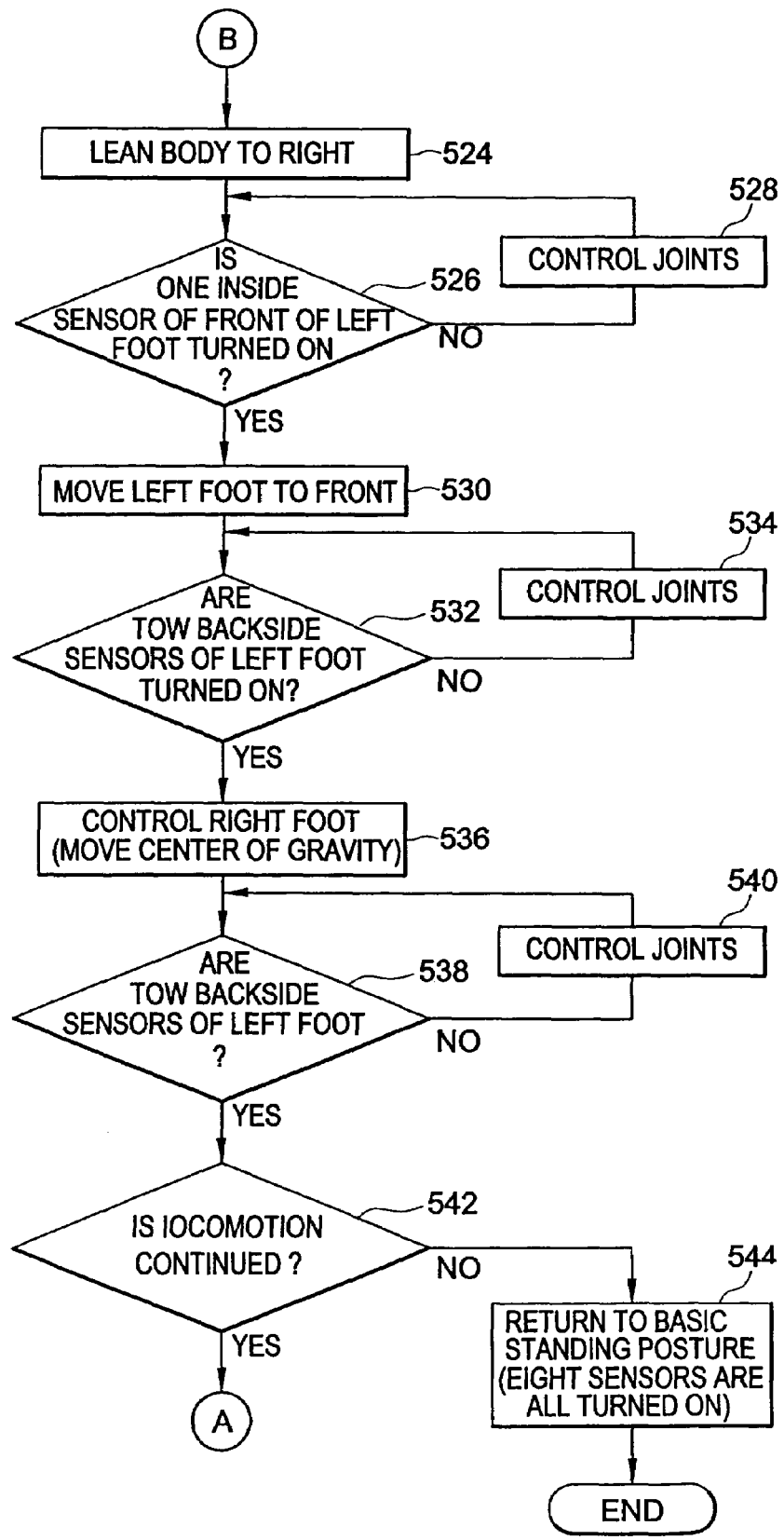

As a series of the locomotion cycles described above are continuously and reflectively performed by the control unit 202, reflective dynamic locomotion of the walking robot of the present invention is implemented. FIGS. 5A and 5B are flowcharts showing a control method to implement the locomotion pattern, which corresponds to the locomotion pattern shown in FIG. 4. As shown in FIG. 5A, it is detected whether the eight sensors mounted on the soles of the two feet are all turned on to assume the basic standing posture in operation 502. If any one of the eight sensors is not turned on, a posture of the walking robot is determined not to be the stable basic standing posture, so that the left and right ankle joints are then controlled to obtain the basic standing posture in which the eight sensors are all turned on in operation 504.

Once the basic standing posture is ensured, the body is leaned to the left before the right foot RF is extended forward to perform forward locomotion in operation 506. At this time, an outside of the right foot RF should not be in contact with the ground. Accordingly, it should be determined whether two outside sensors of the right foot RF (i.e., 104b and 104d) are turned off in operation 508. If the two outside sensors of the right foot RF are not turned off, leaning of the body to the left or right is controlled so that the two outside sensors of the right foot RF are not in contact with the ground and are turned off in operation 510. When the leaned posture is ensured, the right foot RF is lifted and extended forward to perform the forward locomotion in operation 512. At this time, the left foot LF is in contact with the ground, and the right foot RF extended forward is in a state of being completely not in contact with the ground, so that the four sensors of the right foot RF are all turned off. When the right foot RF extended forward steps on the ground, it is determined whether the two backside sensors of the right foot RF (i.e., 104c and 104d) are in contact with the ground and are turned on in operation 514. If the two backside sensors of the right foot RF are not turned on, the joints are controlled so that the backside of the right foot RF comes in contact with the ground and the two sensors are turned on in operation 516. When the right foot RF completely steps on the ground (the four sensors are all turned on), the left foot LF should be immediately extended forward to perform continuous locomotion. For this purpose, stability is ensured by lifting the backside of the left foot LF and, thus, moving the center of gravity to the left in operation 518. After the center of gravity is moved by controlling the left foot LF, it is determined whether the right foot RF is completely in contact with the ground and the four sensors 104a to 104d are all turned on in operation 520. If the four sensors 104a to 104d of the right foot RF are not all turned on, the joints are controlled so that the right foot RF completely steps on the ground and the four sensors 104a to 104d are all turned on in operation 522.

As described above, the continuous forward locomotion is implemented by performing the forward locomotion of the left foot LF after the forward locomotion of the right foot RF. Therefore, when the left foot LF is extended forward, the body is leaned to the right in order not to lose balance thereof in operation 524. It is determined whether one inside sensor located on a front side of the left foot LF is turned on by the leaning control in operation 526. If the one inside sensor located on the front side (i.e., 104b) of the left foot LF is not turned on, the joints are controlled so that an inside part of the front side of the left foot LF comes in contact with the ground and the one inside sensor (i.e., 104b) is turned on in operation 530. At this time, the left foot LF is in the state of being not in contact with the ground and is suspended, so that the four sensors are all turned off. When the left foot LF steps on the ground, a backside of the left foot LF comes in contact with the ground. Accordingly, it is determined whether the two backside sensors (i.e., 104c and 104d) of the left foot LF are turned on in operation 532. If the two backside sensors of the left foot LF are not turned on, the joints are controlled so that the backside of the left foot LF comes in contact with the ground and the two sensors are turned on in operation 534. When the left foot LF is completely in contact with the ground (the four sensors are all turned on), the right foot RF should be immediately extended forward to implement the continuous locomotion, and the center of gravity is moved by slightly lifting the backside of the left foot LF in operation 536. Thereafter, it is determined whether the left foot LF completely steps on the ground and four sensors 104a to 104d of the left foot LF are all turned on in operation 538. If the four sensors of the left foot LF are not all turned on, the joints are controlled so that the left foot LF completely steps on the ground and the four sensors are all turned on in operation 540.

As described above, the continuous forward locomotion of the right foot RF and the left foot LF is implemented. If continuation of the locomotion is desired in operation 542, the process is repeated from operation 506 of leaning the body to the left, so that the continuous reflective dynamic locomotion is implemented. If discontinuation of the locomotion is desired, the walking robot returns to the basic standing posture in which the eight sensors 104a to 104d of each of the two feet LF and RF are all turned on in operation 544.

As apparent from the above description, the present invention provides the walking robot and the method of controlling the walking robot, which provide the above various effects by mounting inexpensive sensors, such as touch sensors, FSR sensors or pressure sensors, on the sole 102 and digitally using the sensors.

Since the inexpensive sensors are digitally managed and a complicated ZMP operation does not need to be performed, a control algorithm is simple and the number of operations is small. Furthermore, setting of a feedback gain is simple due to the digital management. Accordingly, programming of the control algorithm is easily practiced not only in an arithmetic and logic unit but also in a personal computer or a microcomputer, so that both the development costs and a product price may be reduced.

Furthermore, an entire locomotion pattern is stabilized because a next locomotion cycle is performed after the stability of a current locomotion cycle is ensured, so that it is easy to fabricate a stable locomotion pattern having various locomotion cycles. Moreover, since there is no unnecessary motions required to connect the locomotion cycles, high-speed locomotion is enabled. The locomotion pattern of the present invention does not need a control related to a velocity (time) because there is no motion subject to the velocity, so that an RTOS is not needed. Accordingly, the walking robot and the method of controlling the walking robot of the present invention reduces the development costs and product price of the walking robot, and allows even a non-specialist to participate in the development because the present invention does not need a high-priced development processor.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A walking robot, comprising:
a plurality of legs each having a respective sole; and
one or more sensors mounted on each of the soles to detect whether each of the soles is in contact with a ground during locomotion, the walking robot performing the locomotion according to a reflective dynamic locomotion pattern composed of a plurality of locomotion cycles, and proceeding from a current locomotion cycle to a next locomotion cycle after determining whether the current locomotion cycle is stable using detection results of the sensors.

2. The walking robot as set forth in claim 1, wherein the sensors are three or more sensors mounted on each of the soles, the sensors being provided with states that are changed by a ground reaction force generated when the respective sole comes in contact with the ground.

3. The walking robot as set forth in claim 2, wherein the sensors each generate two values that represent states of the ground reaction force being applied to the sole and not being applied to the sole, respectively.

4. The walking robot as set forth in claim 3, wherein the sensors are four sensors arranged and spaced apart from each other to form a rectangle.

5. The walking robot as set forth in claim 4, wherein:
information on changes of the states of the four sensors generated when each of the locomotion cycles is stably performed is previously stored;
information on changes of the states of the sensors generated when the current locomotion cycle is actually performed is obtained; and
stability of the current locomotion cycle is evaluated by comparing the obtained information with the previously stored information.

6. The walking robot as set forth in claim 5, wherein:
locations of contact parts of the sole with the ground are detected using the information on the changes of states of the sensors during locomotion; and
a current posture is evaluated using the locations of the contact parts of the sole.

7. The walking robot as set forth in claim 2, wherein the sensors are touch sensors, the touch sensors detecting two states of the sole being in contact with the ground and not being in contact with the ground, respectively.

8. The walking robot as set forth in claim 2, wherein the sensors are force sensing resistor (FSR) sensors, the FSR sensors detecting forces applied to the sole when the sole comes in contact with the ground so as to detect two states of each of the forces applied to the sole being equal to or higher than a preset maximum value, and being lower than the preset maximum value, respectively.

9. The walking robot as set forth in claim 2, wherein the sensors are pressure sensors, the pressure sensors detecting pressures applied to the sole when the sole comes in contact with the ground so as to detect two states of each of the pressures applied to the sole being equal to or higher than a preset maximum value, and being lower than the preset maximum value, respectively.

10. The walking robot as set forth in claim 1, wherein the plurality of the locomotion cycles comprise:
a cycle to balance a body to extend at least one foot;
a cycle to extend the foot; and
a cycle to place the extended foot on the ground.

11. A walking robot, comprising:
a plurality of legs;
a plurality of feet each provided with a sole having an area and each connected mechanically to a respective one of the legs through ankle joints;
a plurality of sensors mounted at predetermined locations of each sole formed on a lower part of each of respective legs, and provided with states that change by coming in contact with a ground during locomotion;
a storage unit to store information on the changes of states of the sensors previously obtained when locomotion cycles are stably performed during the locomotion according to a reflective dynamic locomotion pattern composed of the plurality of locomotion cycles, and to store the information; and a control unit to obtain the information on the changes of states of the sensors, to evaluate stability of a current locomotion cycle by comparing the obtained information with the stored information, and to control the ankle joints to allow the current locomotion cycle to have stability.

12. The walking robot as set forth in claim 11, wherein each of the plurality of sensors generate two representative values that represent states of a ground reaction force being applied to the sole and no ground reaction force being applied to the sole, respectively.

13. The walking robot as set forth in claim 11, wherein the control unit controls the ankle joints to reflectively perform a next locomotion cycle of the locomotion pattern when the stability of the current locomotion cycle is ensured.

14. The walking robot as set forth in claim 11, wherein the plurality of locomotion cycles comprise:
a cycle to balance a body to extend at least one foot;
a cycle to extend the foot; and
a cycle to place the extended foot on the ground.

15. A method of controlling a walking robot, the walking robot having sensors mounted at predetermined locations of each of a plurality of soles and provided with states that change by an external force, and performing locomotion according to a reflective dynamic locomotion pattern composed of a plurality of locomotion cycles, the method comprising:
evaluating a current locomotion cycle and stability of the locomotion using the changes of states of the sensors generated when the plurality of the soles come into contact with a ground when the walking robot performs locomotion; and
controlling a posture of the walking robot and performing a next locomotion cycle according to results of the evaluation.

16. The method of controlling the walking robot as set forth in claim 15, wherein the plurality of locomotion cycles comprise:
a cycle to balance a body to extend at least one foot;
a cycle to extend the foot; and
a cycle to place the extended foot on the ground.

17. The method of controlling the walking robot as set forth in claim 15, wherein the sensors each generate two representative values that represent states of a ground reaction force being applied to the sole and no ground reaction force being applied to the sole, respectively.

18. The method of controlling the walking robot as set forth in claim 15, wherein if discontinuation of locomotion is desired, the walking robot is returned to a basic standing posture where the plurality of soles are positioned in complete contact with the ground.

19. The method of controlling the walking robot as set forth in claim 16, wherein the cycle to balance the body includes leaning the body to a side opposite to a side in which the extended foot is located.

20. A control system of a walking robot, the walking robot having left and right legs each having a foot and a sole attached thereto via respective left and right an ankle joints controlled by respective left and right ankle joint motors, the control system comprising:
a sensor unit mounted on each sole of the walking robot;
a control unit to receive information from the sensor unit and evaluate a current movement state and stability of the walking robot based on the received information, and to generate a control signal corresponding to the received information; and
a joint drive unit to obtain a stable movement of the walking robot by activating the left ankle joint motor and the right ankle motor in a reflective dynamic locomotion pattern according to the control signal generated by the control unit.

* * * * *